(12) United States Patent
Yueh et al.

(10) Patent No.: US 11,366,628 B2
(45) Date of Patent: Jun. 21, 2022

(54) TILED ELECTRONIC DEVICE

(71) Applicant: Innolux Corporation, Miao-Li County (TW)

(72) Inventors: Jui-Jen Yueh, Miao-Li County (TW); Kuan-Feng Lee, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 0 days.

(21) Appl. No.: 17/027,721

(22) Filed: Sep. 22, 2020

(65) Prior Publication Data

US 2021/0109700 A1    Apr. 15, 2021

(30) Foreign Application Priority Data

Oct. 9, 2019 (CN) .......................... 201910955224.0

(51) Int. Cl.
| | |
|---|---|
| *G06F 3/14* | (2006.01) |
| *G09G 3/00* | (2006.01) |
| *G06F 3/147* | (2006.01) |

(52) U.S. Cl.
CPC ............ *G06F 3/1423* (2013.01); *G06F 3/147* (2013.01); *G09G 3/035* (2020.08); *G09G 2300/02* (2013.01); *G09G 2380/02* (2013.01)

(58) Field of Classification Search
CPC .. G09G 3/3233; G09G 3/3258; G09G 3/3266; G09G 3/3291; G09G 3/035; G09G 2380/02; G09G 2300/02; G09G 2370/08; G09G 5/14; G09G 2360/04; G06F 3/038; G06F 3/1423; G06F 3/147; G06F 3/0483; G06F 3/1446; G09F 9/301
See application file for complete search history.

(56) References Cited

U.S. PATENT DOCUMENTS

| | | | | |
|---|---|---|---|---|
| 7,071,894 | B1* | 7/2006 | Thielemans | G06F 3/1446 345/1.1 |
| 9,489,080 | B2* | 11/2016 | Seo | G06F 3/0484 |
| 10,254,863 | B2* | 4/2019 | Shin | G06F 1/1677 |
| 10,712,991 | B2* | 7/2020 | Cheon | H04W 4/00 |
| 10,719,284 | B2* | 7/2020 | Yamazaki | G06F 1/1624 |
| 10,983,381 | B2* | 4/2021 | Jeong | G02B 6/0068 |
| 2015/0309691 | A1* | 10/2015 | Seo | G06F 3/0416 345/173 |
| 2016/0132281 | A1* | 5/2016 | Yamazaki | G06F 3/044 345/1.3 |
| 2020/0074940 | A1* | 3/2020 | Yamazaki | G09G 5/10 |

(Continued)

FOREIGN PATENT DOCUMENTS

EP          3376366          9/2018

OTHER PUBLICATIONS

"Search Report of Europe Counterpart Application", dated Feb. 11, 2021, p. 1-p. 108.

*Primary Examiner* — Vijay Shankar
(74) *Attorney, Agent, or Firm* — JCIPRNET (57) ABSTRACT

A tiled electronic device includes a first display panel, at least two other display panels and a roller. The first display panel transmits a plurality of signals to the at least two other display panels directly. The at least two other display panels include a second display panel being adjacent to the first display panel. The roller is rotatable in a rotating direction, wherein the first display panel is connected to the roller, and the second display panel is connected to the roller.

11 Claims, 9 Drawing Sheets

(56) References Cited

U.S. PATENT DOCUMENTS

| | | | | |
|---|---|---|---|---|
| 2020/0159054 A1* | 5/2020 | Jeong | ................... | G02B 6/0068 |
| 2020/0394984 A1* | 12/2020 | Park | ..................... | G09G 3/3258 |
| 2021/0004193 A1* | 1/2021 | Yamazaki | ............. | G06F 3/0448 |
| 2021/0034107 A1* | 2/2021 | Therien | ................. | G06F 3/0483 |

* cited by examiner

TILED ELECTRONIC DEVICE

CROSS-REFERENCE TO RELATED APPLICATION

This application claims the priority benefit of China application serial no. 201910955224.0, filed on Oct. 9, 2019. The entirety of the above-mentioned patent application is hereby incorporated by reference herein and made a part of this specification.

BACKGROUND OF THE DISCLOSURE

Field of the Disclosure

The disclosure relates to an electronic device and a driving method thereof, and more particularly to an electronic device including a plurality of display panels and a driving method thereof.

Description of Related Art

As electronic products flourish, display techniques used in electronic products are constantly improving. Electronic devices for display continue to improve toward larger and higher resolution display effects.

SUMMARY OF THE DISCLOSURE

According to an embodiment of the disclosure, the electronic device includes a first display panel and at least two other display panels. The first display panel transmits a plurality of signals to the at least two other display panels directly.

According to an embodiment of the disclosure, the driving method of the electronic device includes the following steps. A plurality of signals are provided to a first display panel. The first display panel displays according to a first signal of the plurality of signals. At least two other signals of the plurality of signals are transmitted to at least two other display panels via the first display panel.

BRIEF DESCRIPTION OF THE DRAWINGS

The accompanying drawings are included to provide a further understanding of the disclosure, and the drawings are incorporated into the present specification and form a portion of the present specification. The drawings illustrate embodiments of the disclosure and are used to explain the principles of the disclosure with the descriptions.

DESCRIPTION OF THE EMBODIMENTS

When one of the structures (or layers, components, substrates) described in the disclosure is located on another structure (or layer, component, substrate), it may refer to two structures adjacent to each other and directly connected, or may refer to two structures being adjacent rather than directly connected. Indirect connection means that at least one intermediate structure (or intermediate layer, intermediate component, intermediate substrate, intermediate spacing) is between two structures, i.e. the lower side surface of a structure is adjacent or directly connected to the upper side surface of an intermediate structure, the upper side surface of another structure is adjacent or directly connected to the lower side surface of the intermediate structure, and the intermediate structure may be formed by a single layer or a plurality of layers of a physical structure or a non-physical structure, and the disclosure is not limited thereto. In the disclosure, when a certain structure is placed "on" other structures, it may mean that the certain structure is "directly" on the other structures, or that the certain structure is "indirectly" on the other structures, that is, at least one structure is further sandwiched between the certain structure and the other structures.

The electrical connection or coupling described in the disclosure may all refer to a direct connection or an indirect connection. In the case of direct connection, the ends of the components on two circuits are directly connected or connected to each other via a conductor line segment. In the case of indirect connection, a combination of one of a switch, a diode, a capacitor, an inductor, or components of other non-conductor line segments and at least one conductive segment or resistor, or a combination of at least two of the above and at least one conductive segment or resistor is between the ends of the components on the two circuits.

The "first", "second", etc., in the specification of the disclosure may be used herein to describe various components, members, regions, layers, and/or parts, but these components, members, regions, and/or parts should not be limited by these terms. These terms are only used to distinguish one component, member, region, layer, or part from another component, member, region, layer, or part. Thus, "first component", "member", "region", "layer", or "part" discussed below is used to distinguish from "second component", "member", "region", "layer", or "part" and not to limit a sequence or a particular component, member, region, layer, and/or part.

In the disclosure, the various embodiments described below may be used in combination and without departing from the spirit and scope of the disclosure. For example, some features of one embodiment may be combined with some features of another embodiment to form another embodiment.

The electronic device of the disclosure may include, but is not limited to, a display device, an antenna device, a sensing device, or a tiling device. The electronic device may be a rollable, stretchable, bendable, or flexible electronic device. The electronic device may include, for example, a liquid crystal, a light-emitting diode (LED), a quantum dot (QD), a fluorescence, a phosphor, or other suitable materials, and the materials thereof may be arbitrarily arranged and combined or include other suitable display media, or a combination of the above. The LED may include, for example, an organic light-emitting diode (OLED), a mini LED, a micro LED, or a quantum dot (QD) LED (such as QLED, QDLED), but is not limited thereto. The antenna device may be, for example, a liquid crystal antenna, but is not limited thereto. The tiling device may be, for example, a display tiling device or an antenna tiling device, but is not limited thereto. It should be noted that the electronic device may be any arrangement and combination of the above, but is not limited thereto. Hereinafter, the display device or the tiling device is described as an electronic device to explain the disclosure, but the disclosure is not limited thereto.

In the disclosure, the various embodiments described below may be used in combination and without departing from the spirit and scope of the disclosure. For example, some features of one embodiment may be combined with some features of another embodiment to become another embodiment.

Hereinafter, exemplary embodiments of the disclosure are described in detail, and examples of the exemplary embodiments are conveyed via figures. Wherever possible, the same reference numerals are used in the figures and the descriptions to refer to the same or similar portions.

Figure 1:
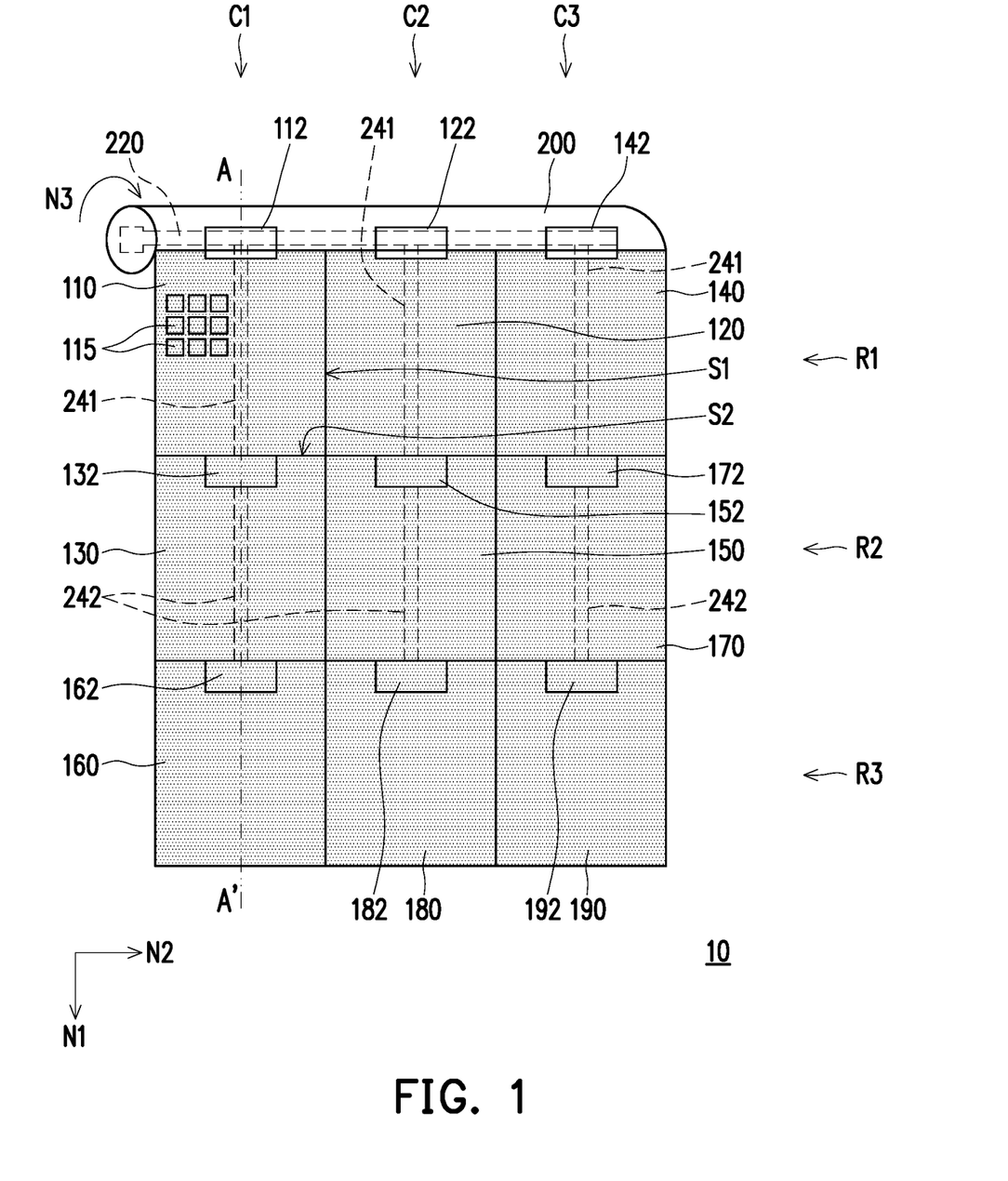
FIG. 1 is a top view of an electronic device of an embodiment of the disclosure.
Figure 2:
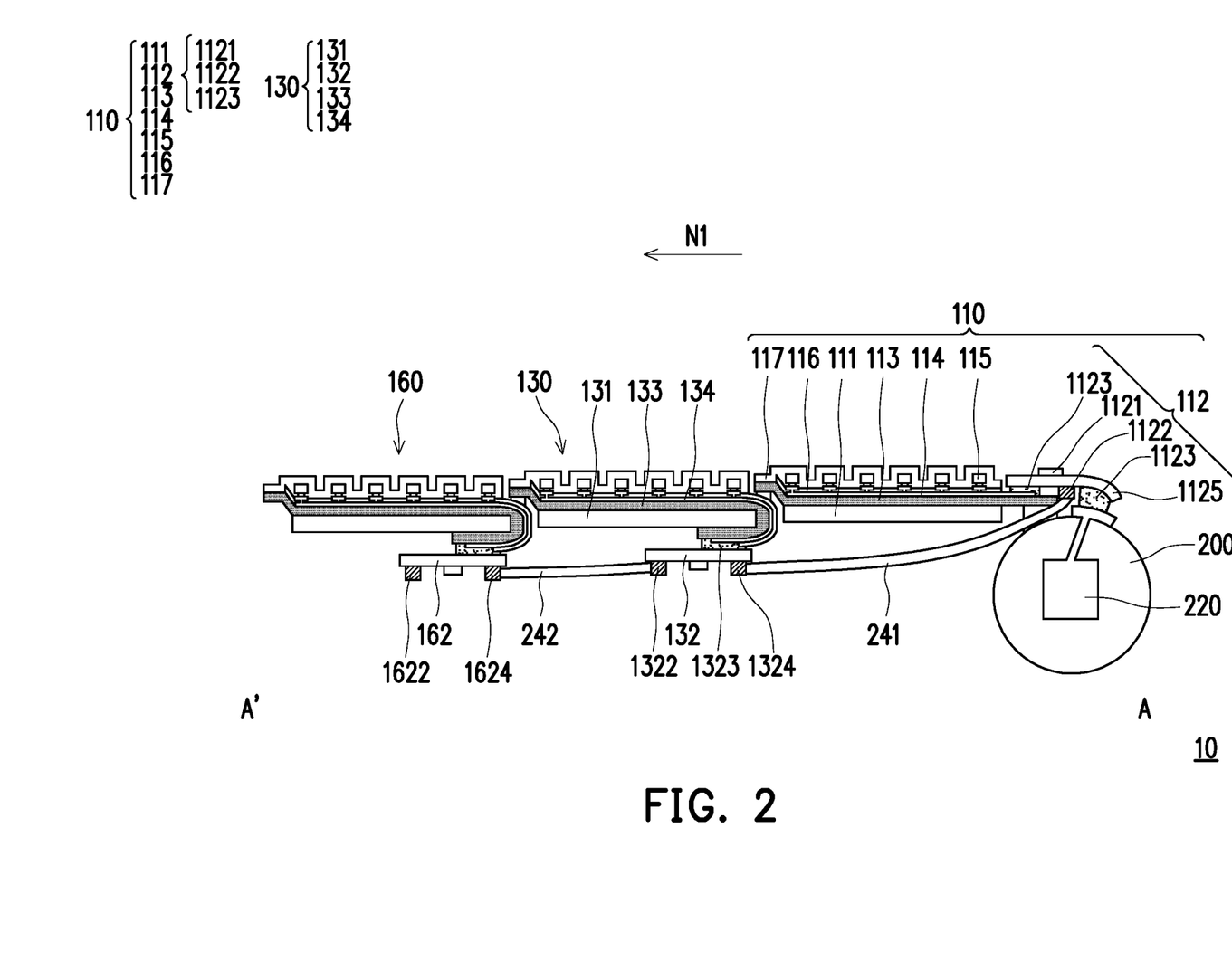
FIG. 2 is a cross-segmental view of the electronic device of FIG. 1 along segment line A-A'.

FIG. 1 is a top view of an electronic device according to an embodiment of the disclosure. For the sake of clarity and convenience of the drawings, FIG. 1 omits several components. FIG. 2 is a cross-segmental view of the electronic device of FIG. 1 along segment line A-A'. For the sake of clarity and convenience of the drawings, FIG. 2 omits several components. Referring to FIG. 1, an electronic device 10 includes a first display panel 110 and at least two other display panels. As shown in FIG. 1, the at least two other display panels include a second display panel 120 and a third display panel 130. The second display panel 120 and the third display panel 130 of the at least two other display panels are adjacent to the first display panel 110 and are respectively located at different sides of the first display panel 110. For example, the second display panel 120 is adjacent to the first display panel 110 and at a first side S1 of the first display panel 110, and the third display panel 130 is adjacent to the first display panel 110 and at a second side S2 of the first display panel 110. The first side S1 of the first display panel 110 extends along a first direction N1, and the second side S2 extends along a second direction N2, and the first direction N1 is perpendicular to the second direction N2. As shown in FIG. 1, the second display panel 120 is, for example, disposed on the right side of the first display panel 110 in the second direction N2, and the third display panel 130 is, for example, disposed on the lower side of the first display panel 110 in the first direction N1, but the disclosure is not limited thereto. In some embodiments, if the display panel is non-rectangular, the sides may be irregular or wavy, but are generally still extended in one direction. The second display panel 120 is adjacent to the first display panel 110 along the second direction N2, this means that there is no display panel disposed between the second display panel 120 and the first display panel 110 along the second direction N2. The second display panel 130 is adjacent to the first display panel 110 along the first direction N1, this means that there is no display panel disposed between the third display panel 130 and the first display panel 110 along the first direction N1.

In the present embodiment, the electronic device 10 further includes a roller 200, and the roller 200 is rotatable in a rotating direction N3, and the rotating direction N3 can be a clockwise or counterclockwise direction. As shown in FIG. 1, the first display panel 110 is connected or coupled to the roller 200, and the second display panel 120 adjacent to the first side S1 may be connected to the roller 200. A signal transmission component 220 may be disposed in the roller 200, and the signal transmission component 220 is configured to be connected to a control unit (such as a control circuit, a computer host, etc.) The first display panel 110 may be electrically connected to the signal transmission component 220 to receive a signal from the control unit. In addition, the third display panel 130 may be coupled to the first display panel 110. In this way, a first driving circuit 112 of the first display panel 110 may directly transmit a plurality of received signals to the second display panel 120 and the third display panel 130 of the two other panels. In other words, the first display panel 110 transmits signals to the at least two other display panels (the second display panel 120 and the third display panel 130 directly. In details, the plurality of signals received by the first driving circuit 112 of the first display panel 110 may be directly transmitted to the second display panel 120 and the third display panel 130 from the first driving circuit 112 of the first display panel 110 without the traces of an active component layer of the first display panel 110, so as to reduce impedance or signal delay to provide an electronic device 10 having better quality. Under the above configuration, the first display panel 110, the second display panel 120, and the third display panel 130 receiving the signals may be composed (or combined) to display an image. That is, the electronic device 10 may be a tiled display device, and more specifically a flexible display device suitable for tiling. In some embodiments, the first display panel can transmit signals simultaneously. In some embodiments, the first display panel can transmit signals sequentially.

For details, referring to FIG. 1 and FIG. 2, the first display panel 110 includes a first flexible substrate 111, a second flexible substrate 113, an active component layer 114, a plurality of light-emitting components 115, a passivation layer 116, and a protective layer 117. In the present embodiment, the second flexible substrate 113 is disposed on the first flexible substrate 111. Although not shown in FIG. 2, in some embodiments, an adhesive layer may be disposed between the second flexible substrate 113 and the first flexible substrate 111. The first flexible substrate 111 is, for example, a flexible sheet-shaped substrate, and the material of the first flexible substrate 111 may include polycarbonate (PC), polyimide (PI), polyethylene terephthalate (PET), other suitable substrate materials, or a combination thereof, but is not limited thereto. The second flexible substrate 113 may be a single-layer or multi-layer composite laminated structure, and the material thereof includes PI, PET, poly (ethylene naphthalate) (PEN), polyethersulfone (PES), other suitable substrate materials, or a combination of the above, but is not limited thereto. In some embodiments, the material of the first flexible substrate 111 and/or the second flexible substrate 113 may include a copper foil, but is not limited thereto. Under the above configuration, the first display panel 110 includes, for example, a flexible display panel, but is not limited thereto.

In the present embodiment, the active component layer 114 is disposed on the second flexible substrate 113. The active component layer 114 includes a plurality of dielectric layers (not shown), a plurality of signal traces (not shown), an active component array (not shown), and a plurality of pads (not shown). A plurality of signal traces are disposed in the plurality of dielectric layers, and the active component array is electrically connected to the plurality of signal traces. In the present embodiment, the signal traces include, for example, a plurality of scan lines, a plurality of data lines, a plurality of common electrode lines, and/or a plurality of power lines, but is not limited thereto. The active component array includes a plurality of active components (not shown) arranged in the plurality of dielectric layers. The active components may include a thin film transistor such as a top gate thin film transistor, a bottom gate thin film transistor, or other suitable thin film transistors, but is not limited thereto. Each active component includes a gate, a semiconductor layer, and a source and a drain electrically connected to the semiconductor layer. The gate, the source, and the drain may include a conductive material such as molybdenum, aluminum, copper, titanium, or a combination thereof, but is not limited thereto. The semiconductor layer may include amorphous silicon, low-temperature polysilicon, metal oxide, or a combination thereof, but is not limited thereto. In the present embodiment, each pad may be electrically connected to the drain of each active component. The pads may include a conductive material such as molybdenum, aluminum, copper, titanium, or a combination thereof, but is not limited thereto.

As shown in FIG. 2, the passivation layer 116 is disposed on the active component layer 114. The passivation layer 116 may include a plurality of openings (not labeled), and the plurality of pads of the active component layer 114 may be disposed corresponding to the plurality of openings. The material of the passivation layer 116 includes silicon oxide, silicon nitride, silicon oxynitride, or a combination thereof, but is not limited thereto.

In the present embodiment, the plurality of light-emitting components 115 are disposed on the active component layer 114 and electrically connected to the plurality of pads of the active component layer 114. As shown in FIG. 1 and FIG. 2, the plurality of light-emitting components 115 are arranged in an array on the active component layer 114, but are not limited thereto. It should be noted that, although FIG. 1 schematically shows that the first display panel 110 includes nine light-emitting components 115 arranged in an array, the present embodiment is not limited thereto. It should be understood by those skilled in the art that the number and arrangement pattern of the light-emitting components 115 may be configured according to the needs of the user, and are not limited to those shown in FIG. 1. In the present embodiment, each of the light-emitting components 115 may be regarded as one pixel unit or one sub-pixel unit. The light-emitting components 115 may include a light-emitting diode (LED), other suitable materials, or a combination of the above materials, but are not limited thereto. The light-emitting diode may include, for example, an organic light-emitting diode, a micro light-emitting diode or a mini light-emitting diode, or a combination thereof, but is not limited thereto.

In the present embodiment, the protective layer 117 is disposed on the second flexible substrate 113 and covers the plurality of light-emitting components 115. As shown in FIG. 2, the active component layer 114, the passivation layer 116, and the plurality of light-emitting components 115 are disposed between the protective layer 117 and the second flexible substrate 113. The material of the protective layer 117 includes acrylic resin, silicone resin, epoxy resin, or other suitable materials, but is not limited thereto. In some embodiments, the protective layer 117 may be a single layer or a multilayer structure.

In the present embodiment, each display panel further includes a driving circuit. In detail, the first display panel 110 includes a first driving circuit 112. The first driving circuit 112 includes an integrated circuit (IC), a flexible printed circuit board (FPC), a chip-on-film (COF), or a combination thereof, or other suitable components, but is not limited thereto. As shown in FIG. 2, the first driving circuit 112 may include a chip 1121, an output terminal 1122, and a circuit board 1125. In the present embodiment, the chip 1121 is disposed on an upper surface of the circuit board 1125, but is not limited thereto. In some embodiments, the chip 1121 may also be disposed on a lower surface of the circuit board 1125. In the present embodiment, the first driving circuit 112 may be electrically connected to the active component layer 114 and the signal transmission component 220 in the roller 200 via a plurality of conductive adhesives 1123, respectively. In the present embodiment, the material of the conductive adhesives 1123 may include an anisotropic conductive film (ACF), a conductive silver adhesive, other suitable materials, or a combination of the above materials, but is not limited thereto.

Referring to FIG. 1 and FIG. 2, the electronic device 10 further includes a plurality of other display panels. The structures and members of these other display panels are substantially similar to the structures and members of the first display panel 110. For example, both of the first display panel 110 and the second display panel 120 include a flexible substrate, an active component layer, a light-emitting component, and a driving circuit electrically connected to the active component layer, and thus the same or similar members in the first display panel 110 and the second display panel 120 are denoted by the same and similar reference numerals and are not repeated herein. Herein, the first display panel 110 and other display panels shown in FIG. 1 are, for example, rectangular, but are not limited thereto. In some embodiments, the shape of the display panels may include a circular shape, a wavy shape, an irregular shape, or a combination thereof, but is not limited thereto.

As shown in FIG. 1, the second display panel 120 is connected to the roller 200, and a second driving circuit 122 of the second display panel 120 is electrically connected to the signal transmission component 220 in the roller 200, but is not limited thereto. In the present embodiment, the electronic device 10 further includes a fourth display panel 140 connected to the roller 200. The second display panel 120 is located between the first display panel 110 and the fourth display panel 140. A fourth driving circuit 142 of the fourth display panel 140 is electrically connected to the signal transmission component 220 in the roller 200. The same or similar members in the first display panel 110 and the fourth display panel 140 are denoted by the same and similar reference numerals and are not repeated herein. In the present embodiment, the signal transmission component 220 may be, for example, a bus line including a transmission structure connected to a control unit and extending along the second direction N2 and located in the roller 200. The transmission structure connected to the control unit has a plurality of branches (not shown). One of the plurality of branches is electrically connected to the first driving circuit 112, another of the plurality of branches is connected to the second driving circuit 122, and yet another of the plurality of branches is connected to the fourth driving circuit 142. As a result, the first driving circuit 112, the second driving circuit 122, and the fourth driving circuit 142 may be directly coupled to the signal transmitting component 220. Under the above configuration, the signal may be transmitted to the first driving circuit 112 of the first display panel 110 via the signal transmission component 220, and then transmitted to the second driving circuit 122 of the second display panel 120 and the fourth driving circuit 142 of the fourth display panel 140 via the signal transmission component 220, but the present embodiment is not limited thereto.

In other embodiments, the signal transmission component 220 may include a transmission structure connected to the control unit and a plurality of other wires, wherein the first driving circuit 112 is electrically connected to the transmission structure of the control unit, another of the plurality of other wires electrically connects the first driving circuit 112 to the second driving circuit 122, and yet another of the plurality of other wires electrically connects the second driving circuit 122 to the fourth driving circuit 142. Under the above configuration, all the signals may be transmitted to the first driving circuit 112 of the first display panel 110 via the main transmission structure, and then the signals to be transmitted to the second driving circuit 122 and the fourth driving circuit 142 are transmitted to the second driving circuit 122 of the second display panel 120 via the corresponding wires. Then, the signal to be transmitted to the fourth driving circuit 142 is transmitted from the second driving circuit 122 to the fourth driving circuit 142 of the fourth display panel 140.

In yet another embodiment, the signal transmission component 220 may include a plurality of wires that may be respectively connected to a control unit (not shown). The first driving circuit 112, the second driving circuit 122, and the fourth driving circuit 142 can be electrically connected to corresponding wires, respectively. Under the above configuration, the signals may be transmitted to the first driving circuit 112, the second driving circuit 122, and the fourth driving circuit 142 via the corresponding wires. Further, in the above embodiment, the length of the wire connected to the fourth driving circuit 142 may be greater than the length of the wire connected to the second driving circuit 122 and greater than the length of the wire connected to the first driving circuit 112, but is not limited thereto.

Referring to FIG. 1 and FIG. 2, in the first direction N1, the third display panel 130 of the other display panels is coupled to the first display panel 110. The same or similar members in the first display panel 110 and the third display panel 130 are denoted by the same and similar reference numerals and are not repeated herein.

As shown in FIG. 2, the second flexible substrate 113 of the first display panel 110 may be disposed on and connected to the third display panel 130. In the present embodiment, the first display panel 110 may be bonded to the third display panel 130 via the adhesive layer, but is not limited thereto. In some embodiments, the active component layer of the first display panel may also be electrically connected to the active component layer of the third display panel via a conductive adhesive.

In the present embodiment, the second flexible substrate 133 of the third display panel 130 may be bent from the upper surface of the first flexible substrate 131 to the lower surface relative to the upper surface, and a portion of the second flexible substrate 133 may be fixed to the lower surface of the first flexible substrate 131 via an adhesive layer. The active component layer 134 on the second flexible substrate 133 may be electrically connected to the third driving circuit 132 on the lower surface of the first flexible substrate 131 via a conductive adhesive 1323. The third driving circuit 132 includes an output terminal 1322 and an input terminal 1324. It should be noted that the first driving circuit 112 may also have an input terminal (not shown). The first driving circuit 112 may be electrically connected to the signal transmission component 220 in the roller 200 via the input terminal, but is not limited thereto.

It should be noted that in the present embodiment, the electronic device 10 may further include a connection structure 241. The connection structure 241 can be, for example, wires or cables, but are not limited thereto. As shown in FIG. 1 and FIG. 2, the connection structure 241 may be electrically connected to the output terminal 1122 of the first driving circuit 112 and the input terminal 1324 of the third driving circuit 132. The material of the connection structure 241 may include a conductive material such as molybdenum, aluminum, copper, titanium, or a combination thereof, but is not limited thereto. Under the above configuration, the first display panel 110 may be directly electrically connected to the third display panel 130 via the connection structure 241, and the first display panel 110 may be electrically connected to the second display panel 120 via the signal transmission component 220. In this way, the plurality of signals provided to the first display panel 110 may be directly transmitted from the first driving circuit 112 to the third driving circuit 132 of the third display panel 130 via the connection structure 241 along the first direction N1, and the plurality of signals may also be directly transmitted from the first driving circuit 112 to the second driving circuit 122 of the second display panel 120 via the signal transmission component 220 along the second direction N2. In other words, the plurality of signals provided to the first display panel 110 may be directly transmitted from the first driving circuit 112 to the second driving circuit 122 and/or the third driving circuit 132 without the traces of the active component layer 114 of the first display panel 110. Thus, the cross-talk of signals may be reduced, the impedance of circuit transmission may be reduced, or signal delay may be reduced to avoid signal distortion or to simplify the design of the traces on the display panel, so that the electronic device 10 has better quality.

In other embodiments, the output terminal and the input terminal of the driving circuit of each display panel may be optionally changed to the transmitting and receiving terminals of wireless transmission, and the above-mentioned connection structure may be optionally omitted in this situation. The plurality of signals provided to the first display panel 110 may be directly transmitted from the first display panel 110 to the second driving circuit 122 and/or the third driving circuit 132 via a wireless transmission method without the traces of the active component layer 114 of the first display panel 110. Thus, the cross-talk of signals may be reduced, the impedance of circuit transmission may be reduced, or signal delay may be reduced so as to avoid signal distortion or to simplify the design of the traces on the display panel, so that the electronic device 10 has better quality.

Referring to FIG. 1 and FIG. 2, the electronic device 10 may optionally further serially connect a plurality of display panels in a column in the first direction N1. For example, the electronic device 10 may include a fifth display panel 150, a sixth display panel 160, a seventh display panel 170, an eighth display panel 180, and a ninth display panel 190. The same and similar members in the first display panel 110 as the fifth display panel 150, the sixth display panel 160, the seventh display panel 170, the eighth display panel 180, and the ninth display panel 190 are denoted by the same and similar reference numerals and are not repeated herein. It should be noted that FIG. 1 only schematically shows that the nine display panels are divided into three rows and three columns, but the present embodiment is not limited thereto. It should be understood by those skilled in the art that the number and arrangement pattern of the display panels may be configured according to the needs of the user, and are not limited to those shown in FIG. 1.

In the present embodiment, the sixth display panel 160 is coupled to the third display panel 130 in the first direction N1. As shown in FIG. 1 and FIG. 2, a sixth driving circuit 162 of the sixth display panel 160 has an output terminal 1622 and an input terminal 1624. The electronic device 10 also includes a connection structure 242. The connection structure 242 can be, for example, wires or cables, but are not limited thereto. The connection structure 242 can be electrically connected to the output terminal 1322 of the third driving circuit 132 and the input terminal 1624 of the sixth driving circuit 162. In this manner, the first display panel 110, the third display panel 130, and the sixth display panel 160 may be connected in series to form a first vertical column C1 such that the signal of the first driving circuit 112 may be transmitted to the sixth driving circuit 162 via the connection structure 241, the second driving circuit 132, and the connection structure 242.

Similarly, as shown in FIG. 1, in the first direction N1, the fifth display panel 150 may be coupled to the second display panel 120, and the eighth display panel 180 may be coupled to the fifth display panel 150. In other words, the second display panel 120, the fifth display panel 150, and the eighth display panel 180 may be connected in series to form a second vertical column C2, so that the signal of the second driving circuit 122 may be transmitted to the eighth driving circuit 182 via the connection structure 241, the fifth driving circuit 152, and the connection structure 242.

In addition, in the first direction N1, the fourth display panel 140 may be coupled to the seventh display panel 170, and the seventh display panel 170 may be coupled to the ninth display panel 190. In other words, the fourth display panel 140, the seventh display panel 170, and the ninth display panel 190 may be connected in series to form a third vertical column C3, and the signal of the fourth driving circuit 142 may be transmitted to the ninth driving circuit 192 via the connection structure 241, the seventh driving circuit 172, and the connection structure 242.

As shown in FIG. 1, display panels located in the same vertical column (extended in the first direction N1) are electrically connected to one another. In addition, the second display panel 120 and the fourth display panel 140 located in a first horizontal row R1 (extended in the second direction N2) with the first display panel 110 may be electrically connected to the first display panel 110 via the signal transmission component 220. However, the signals between the third display panel 130, the fifth display panel 150, and the seventh display panel 170 located in a second horizontal row R2 (extended in the second direction N2) are not transmitted to one another. In addition, the signals between the sixth display panel 160, the eighth display panel 180, and the ninth display panel 190 located in a third horizontal row R3 (extended in the second direction N2) are also not transmitted to one another. That is, after a plurality of signals enter the first display panel 110, the first display panel 110 may transmit the plurality of signals to the third display panel 130 in the first direction N1 and to the second display panel 120 the second direction N2, respectively. Thereby, the above signals may be directly transmitted in series to each display panel on each of the vertical columns without the traces of the active component layer in the display panel. Thus, signal attenuation caused by signals passing through the active component layer circuit can be reduced, such that the electronic device 10 has better quality.

Figure 3:
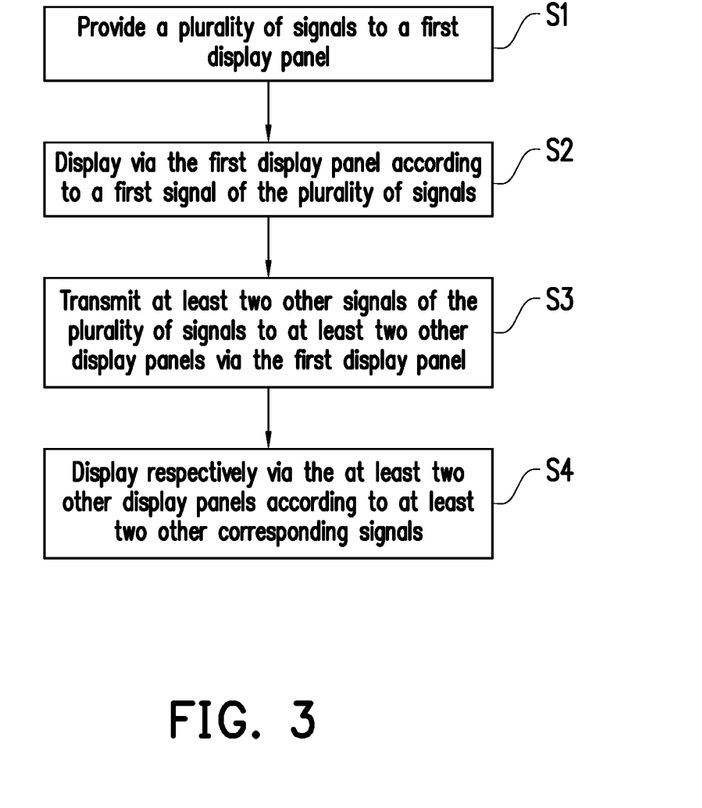
FIG. 3 is a flowchart of a driving method of an electronic device of an embodiment of the disclosure.

FIG. 3 is a flowchart of a driving method of an electronic device according to an embodiment of the disclosure. The driving method of the electronic device 10 is briefly described below with an embodiment. Referring to FIG. 1 and FIG. 3, first, in step S1, a plurality of signals are provided to the first display panel 110. In the present embodiment, a control unit (not shown) may first provide a plurality of signals to the signal transmission component 220 in the roller 200, and then transmit the plurality of signals to the first driving circuit 112 of the first display panel 110. Then, in step S2, the plurality of signals provided to the first display panel 110 include a first signal corresponding to the first display panel 110 and a plurality of other signals corresponding to the other display panels, and the first display panel 110 may display according to the first the signal, and the other display panels may respectively display according to the corresponding signals in the other signals.

Then, in step S3, the first driving circuit 112 of the first display panel 110 transmits a plurality of other signals of the plurality of signals to the other display panels. For example, the first driving circuit 112 transmits a second signal corresponding to the second display panel 120 to the second driving circuit 122 of the second display panel 120 and transmits a third signal corresponding to the third display panel 130 to the third driving circuit 132 of the third display panel 130.

In the present embodiment, the first display panel 110 may simultaneously transmit at least two other signals of the plurality of signals to at least two other display panels, respectively. For example, after receiving the plurality of other signals, the first driving circuit 112 may simultaneously transmit a first portion of the plurality of other signals to the second driving circuit 122 via the signal transmission component 220 along the second direction N2, and transmit a second portion of the plurality of other signals to the third driving circuit 132 via the connection structure 241 along the first direction N1. In addition to the signal to be transmitted to the second display panel 120, the first portion of the plurality of other signals may include signals to be transmitted to the fourth display panel 140 and the fifth display panel 150, but is not limited thereto. After the first portion of the plurality of other signals enters the second driving circuit 122, the signal to be transmitted to the fourth display panel 140 may be further transmitted to the fourth driving circuit 142 via the signal transmission component 220, and the signal to be transmitted to the fifth display panel 150 may be transmitted to the fifth driving circuit 152 from the second driving circuit 122 via the connection structure 241, but the disclosure is not limited thereto.

In addition to the signal to be transmitted to the third display panel 130, the signal entering the third driving circuit 132 (that is, the second portion of the plurality of other signals) may include a signal to be transmitted to the sixth display panel 160. After the third driving circuit 132 receives the signal, the signal to be transmitted to the sixth display panel 160 may be further transmitted to the sixth driving circuit 162 via the connection structure 242. In this way, the plurality of signals may be serially transmitted to the third display panel 130 and the sixth display panel 160 on the first vertical column C1 via the first display panel 110. Similarly, in addition to the signal to be transmitted to the third display panel 130 and the signal to be transmitted to the sixth display panel 160, the signal entering the second driving circuit 122 (that is, the second portion of the plurality of other signals) can further include signals to be transmitted to the fifth display panel 150 and the eighth display panel 180. The signals to be transmitted to the fifth display panel 150 and the eighth display panel 180 may be serially transmitted to the fifth display panel 150 and the eighth display panel 180 on the second vertical column C2 via the second display panel 120. In addition to the signal to be transmitted to the fourth display panel 140, the signal entering the fourth driving circuit 142 can further include signals to be transmitted to the seventh display panel 170 and the ninth display panel 190. The signals to be transmitted to the seventh display panel 170 and the ninth display panel 190 may be serially transmitted to the seventh display panel 170 and the ninth display panel 190 on the third vertical column C3 via the fourth display panel 140.

In step S3, at least two other signals may be transmitted from the first display panel 110 to one of at least two other display panels (for example, the second display panel 120 to the ninth display panel 190), and then in step S4, partial signals of the at least two other signals are transmitted to the other of the at least two other display panels from one of the at least two other display panels. The second display panel 120 to the ninth display panel 190 may receive corresponding signals at different times. In some embodiments, the first display panel 110 and other display panels (e.g., the second display panel 120 to the ninth display panel 190) may perform at least one of turning on and refreshing after receiving the corresponding signals of the plurality of signals, respectively. For example, the first display panel 110, the second display panel 120, the third display panel 130, the fourth display panel 140, the fifth display panel 150, the sixth display panel 160, the seventh display panel 170, the eighth display panel 180, and the ninth display panel 190 may receive corresponding signals at different times and each may perform turning on and/or refreshing immediately after receiving the corresponding signal. In the present embodiment, the first display panel 110 may display according to a first signal of the plurality of signals, and the other display panels respectively display according to other corresponding signals. In addition, the signals are adapted to tile the display image of the first display panel 110 and the display images of the other display panels (the second display panel 120 to the ninth display panel 190) into a complete image. Therefore, the electronic device 10 is tiled with a plurality of display panels and may display an image of a desired size (for example, a large size, 100 inches or more). In addition, according to some embodiments, signals of different display panels may be transmitted via the signal transmission component 220 and the connection structures 241 and 242, impedance of circuit transmission may be reduced or signal delay may be reduced, so that the plurality of display panels may substantially be simultaneously lighted or refreshed such that the electronic device 10 has better quality.

In other embodiments, the first display panel 110, the second display panel 120, the third display panel 130, the fourth display panel 140, the fifth display panel 150, the sixth display panel 160, the seventh display panel 170, the eighth display panel 180, and the ninth display panel 190 may respectively receive the corresponding signals of the signals at different times. However, according to some embodiments, after all the display panels receive the corresponding signals, all the display panels may simultaneously perform at least one of turning on and refreshing. That is to say, the refreshing operations of these display panels may be performed simultaneously.

Figure 4:
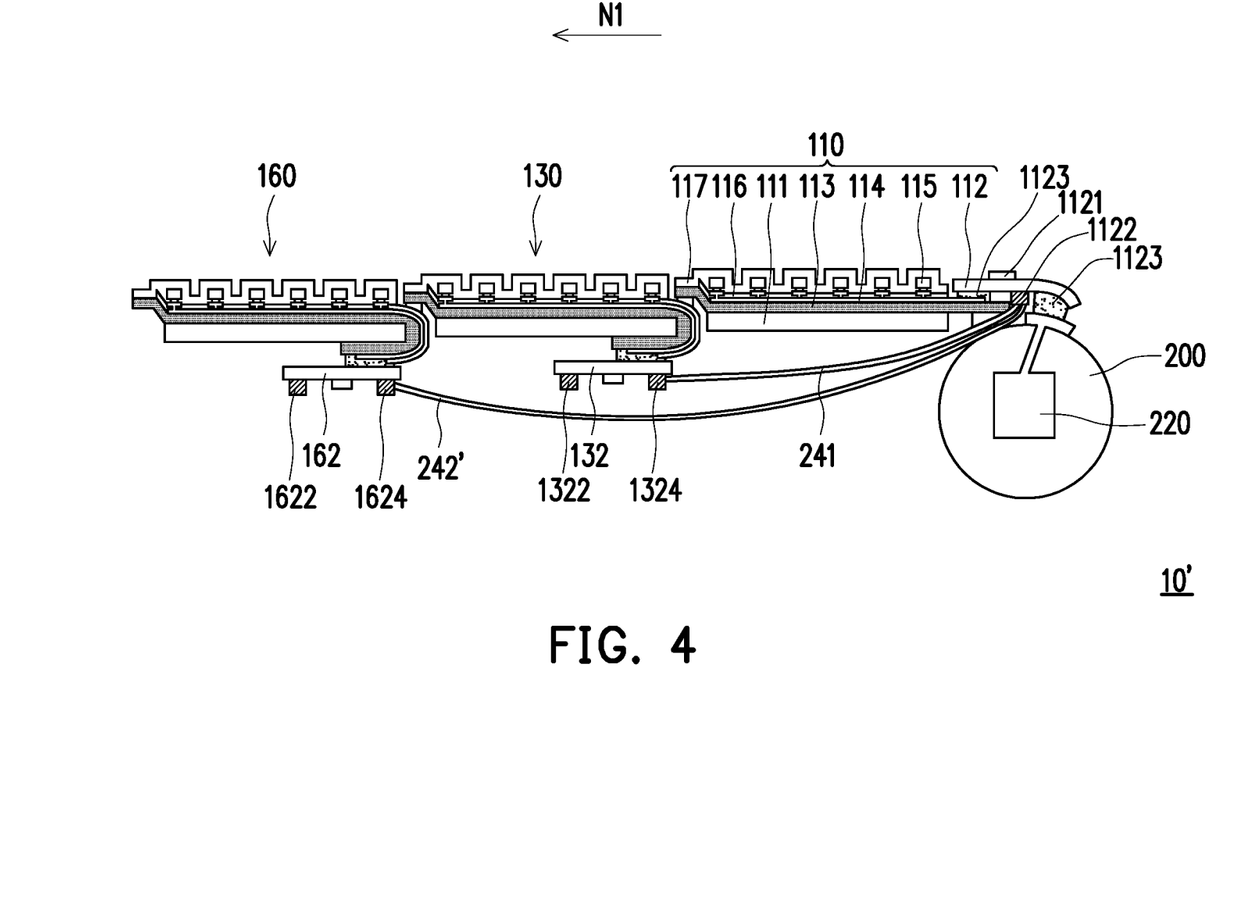
FIG. 4 is a cross-segmental view of an electronic device of another embodiment of the disclosure.

FIG. 4 is a cross-segmental view of an electronic device according to another embodiment of the disclosure. An electronic device 10' of the present embodiment is substantially similar to the electronic device 10 of FIG. 2, and therefore the same and similar members in the two embodiments are not repeated herein. The present embodiment differs from the electronic device 10 mainly in the design of the connection structures 241 and 242'. In the present embodiment, the third driving circuit 132 of the third display panel 130 may be directly electrically connected to the first driving circuit 112 of the first display panel 110 via the connection structure 241. In addition, the sixth driving circuit 162 of the sixth display panel 160 may also be directly electrically connected to the first driving circuit 112 of the first display panel 110 via the connection structure 242'. Under the above configuration, the sixth display panel 160 may be directly electrically connected to the first display panel 110 and the signal of the sixth display panel 160 may be directly transmitted from the first display panel 110 to the sixth display panel 160 without signal transmission via the third display panel 130 or without signal transmission via the circuit on the active component layer of the third display panel 130. Thus, signal cross-talk and circuit transmission impedance can be reduced, or signal delay can be reduced, so as to avoid signal distortion or to simplify the trace design on the display panel such that the electronic device 10' has better quality.

In addition, although not shown in FIG. 4, it will be apparent to those skilled in the art from FIG. 1, FIG. 2, and FIG. 4 that the eighth display panel 180 of the second vertical column C2 may also optionally be directly electrically connected to the second display panel 120 via the connection structure 242', and the ninth display panel 190 of the third vertical column C3 may also optionally be directly electrically connected to the fourth display panel 140 via the connection structure 242'. Thereby, the above excellent technical effects may be obtained.

In other embodiments, the output terminal and the input terminal of the driving circuit of each display panel may be optionally changed to the transmitting and receiving terminals of wireless transmission, and the connection structures may be optionally omitted under this situation. The plurality of signals provided to the first display panel 110 may be directly transmitted from the signal transmission component 220 or the first display panel 110 to the second driving circuit 122 and/or the third driving circuit 132 via a wireless transmission method without the traces of the active component layer 114 of the first display panel 110, so that the cross-talk of signals may be reduced, the impedance of circuit transmission may be reduced, or signal delay may be reduced to avoid signal distortion or to simplify the design of the traces on the display panel, so that the electronic device 10 has better quality.

Figure 5A:
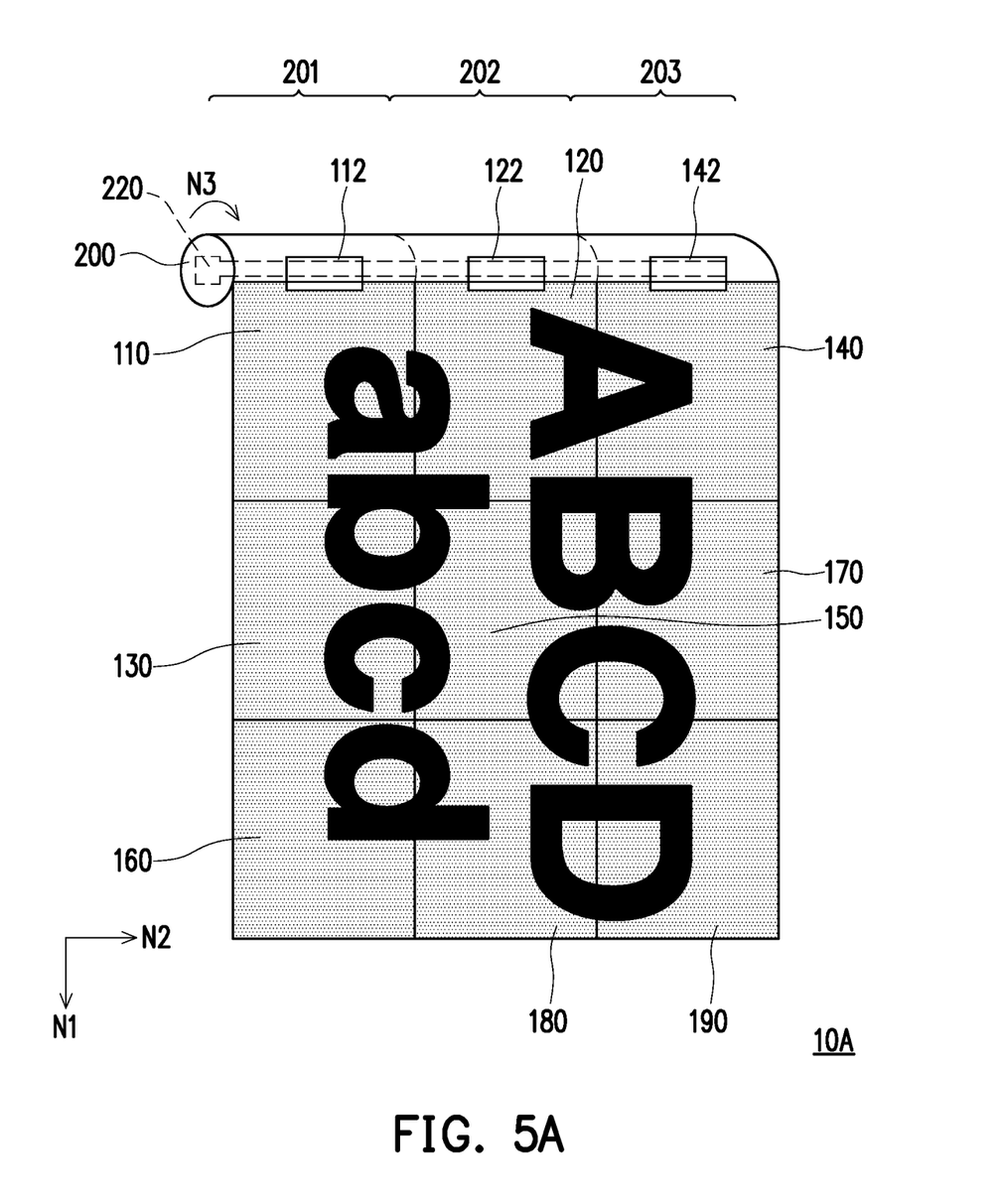
FIG. 5A is a top view of a display method of an electronic device of an embodiment of the disclosure.

FIG. 5A is a top view of a display method of an electronic device according to an embodiment of the disclosure. An electronic device 10A of the present embodiment is substantially similar to the electronic device 10 of FIG. 1, and therefore the same and similar members in the two embodiments are not repeated herein. In the present embodiment, the roller 200 may be divided into a plurality of segments in the second direction N2 and sequentially include a first segment 201, a second segment 202, and a third segment 203 from left to right. Under the above configuration, different segments may be connected to the first display panel 110 and one of at least two other display panels, respectively. For example, the first segment 201 of the roller 200 may be coupled to the first display panel 110, and the second segment 202 may be coupled to the second display panel 120. Additionally, the third segment 203 of the roller 200 may be coupled to the fourth display panel 140.

In the present embodiment, the first segment 201, the second segment 202, and the third segment 203 of the roller 200 may be rotated independently or optionally simultaneously rotated partially or fully. As shown in FIG. 5A, the first segment 201 and the second segment 202 may be rotated simultaneously to drive the first display panel 110 and the second display panel 120 at the same time. In the present embodiment, the third segment 203 may also be rotated simultaneously with the first segment 201 and the second segment 202 to drive the fourth display panel 140 at the same time. Under the above configuration, the roller 200 may be rotated clockwise in the rotation direction N3 such that the first display panel 110, the second display panel 120, the third display panel 130, the fourth display panel 140, the fifth display panel 150, the sixth display panel 160, the seventh display panel 170, the eighth display panel 180, and the ninth display panel 190 correspondingly connected to the first segment 201, the second segment 202, and the third segment 203 respectively are simultaneously rolled out in the first direction N1. In this way, all the images of the display panels can be composed and tiled to form a complete display image of a tiled display device of the electronic device 10A. Thus, the tiled display device can be portrait type. More specifically, the electronic device 10A is substantially a rollable tiled display device adopting a portrait display method. Further, the electronic device 10A may also achieve excellent technical effects similar to those of the above embodiments. In another embodiment, a partial portion or a whole portion of the display panels of the electronic device 10A may be non-rectangular panels.

Figure 5B:
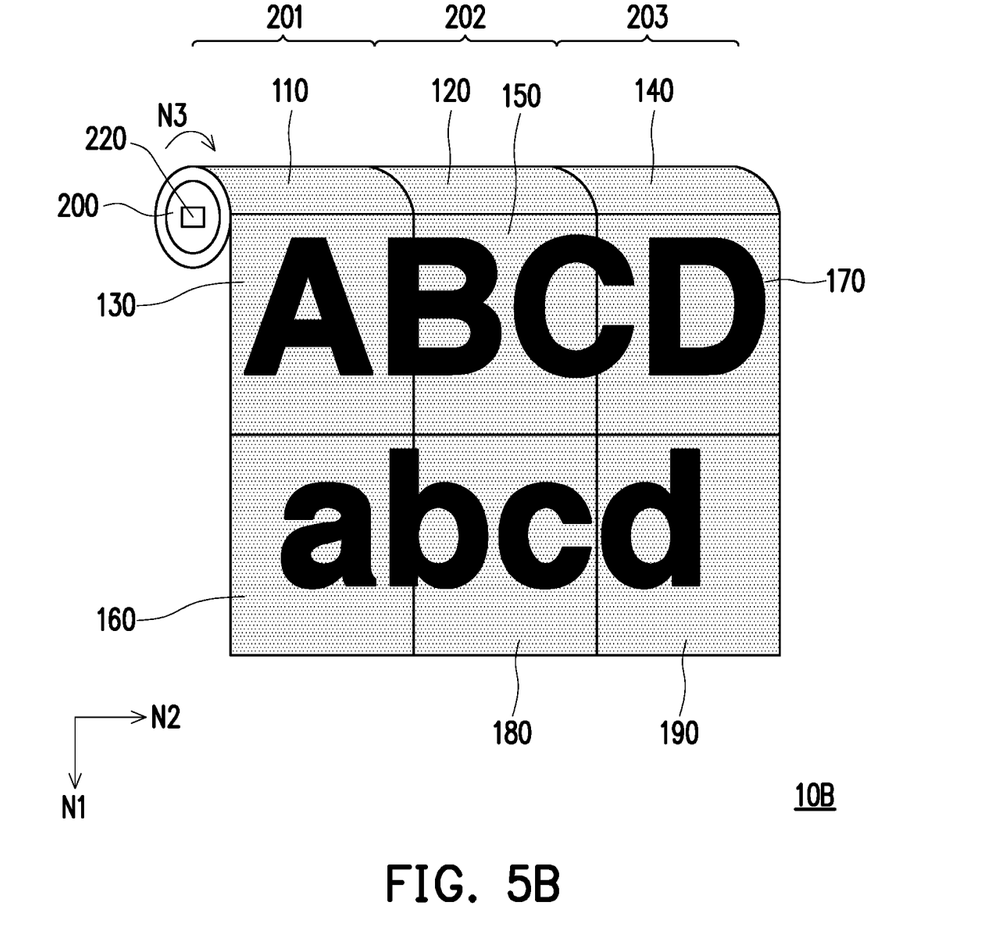
FIG. 5B is a top view of a display method of another electronic device of an embodiment of the disclosure.

FIG. 5B is a top view of a display method of another electronic device according to an embodiment of the disclosure. An electronic device 10B of the present embodiment is substantially similar to the electronic device 10 of FIG. 1, and therefore the same and similar members in the two embodiments are not repeated herein. In the present embodiment, the roller 200 may be rotated clockwise in the rotation direction N3 such that the third display panel 130, the fifth display panel 150, the sixth display panel 160, the seventh display panel 170, the eighth display panel 180, and the ninth display panel 190 correspondingly connected to the first segment 201, the second segment 202, and the third segment 203 respectively are simultaneously rolled out in the first direction N1. In this way, the images of a portion of the display panels (for example, six display panels of three columns and two rows) can be composed and tiled to form a complete display image of a tiled display device of the electronic device 10B. Thus, the tiled display device can be landscape type. More specifically, the electronic device 10B is substantially a rollable tiled display device adopting a landscape display method. Further, the electronic device 10B may also achieve excellent technical effects similar to those of the above embodiment.

Figure 5C:
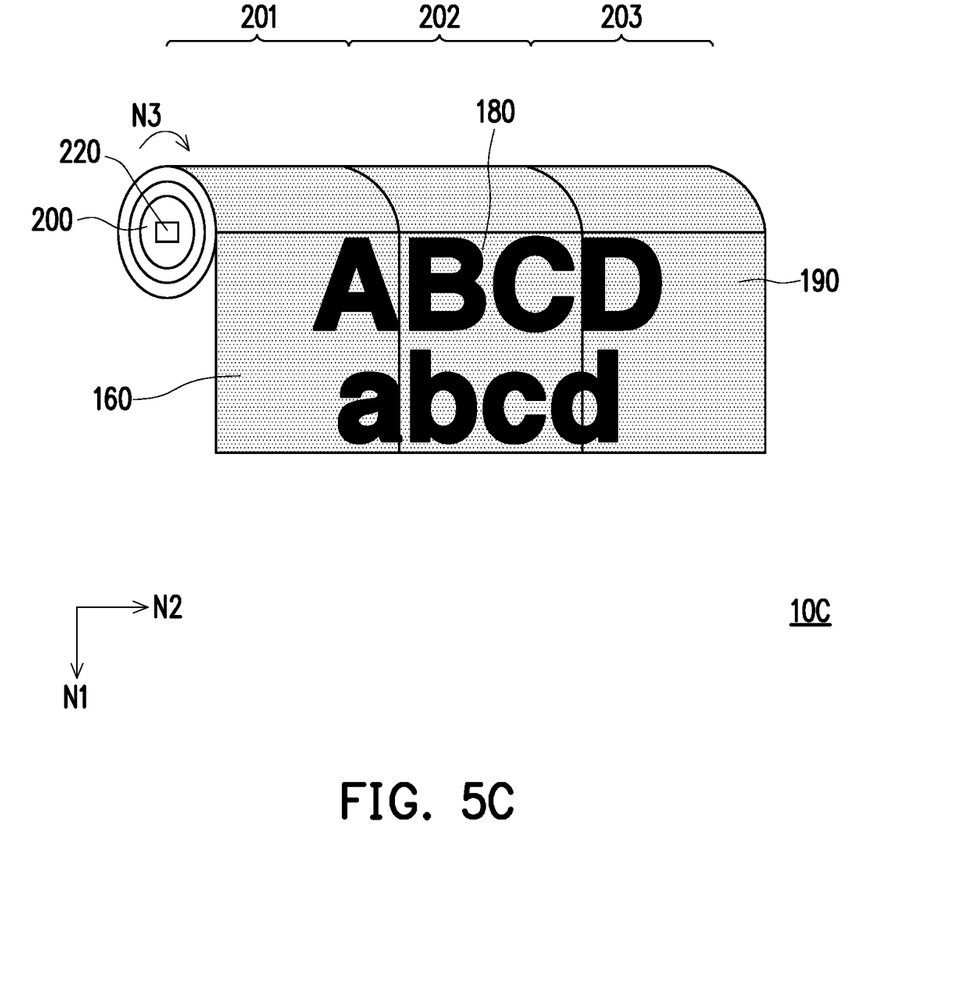
FIG. 5C is a top view of a display method of another electronic device of an embodiment of the disclosure.

FIG. 5C is a top view of a display method of another electronic device according to an embodiment of the disclosure. An electronic device 10C of the present embodiment is substantially similar to the electronic device 10 of FIG. 1, and therefore the same and similar members in the two embodiments are not repeated herein. In the present embodiment, the roller 200 may be rotated clockwise in the rotation direction N3 such that the sixth display panel 160, the eighth display panel 180, and the ninth display panel 190 correspondingly connected to the first segment 201, the second segment 202, and the third segment 203 respectively are simultaneously rolled out in the first direction N1. In this way, the images of a portion of the display panels (for example, three display panels of three columns and a single row) can be composed and tiled to form a complete display image of a tiled display device of the electronic device 10C. In addition, the tiled display device can have a special aspect ratio according to the user's needs. For example, the electronic device 10C may be, for example, a tiled display device of 21:9 aspect ratio (for movie viewing) or 3:2 aspect ratio (for photo or mobile device projection), but is not limited thereto. More specifically, the electronic device 10C is substantially a rollable tiled display device, which can be applied to a special context display. Further, the electronic device 10C may also achieve excellent technical effects similar to those of the above embodiment.

Figure 6:
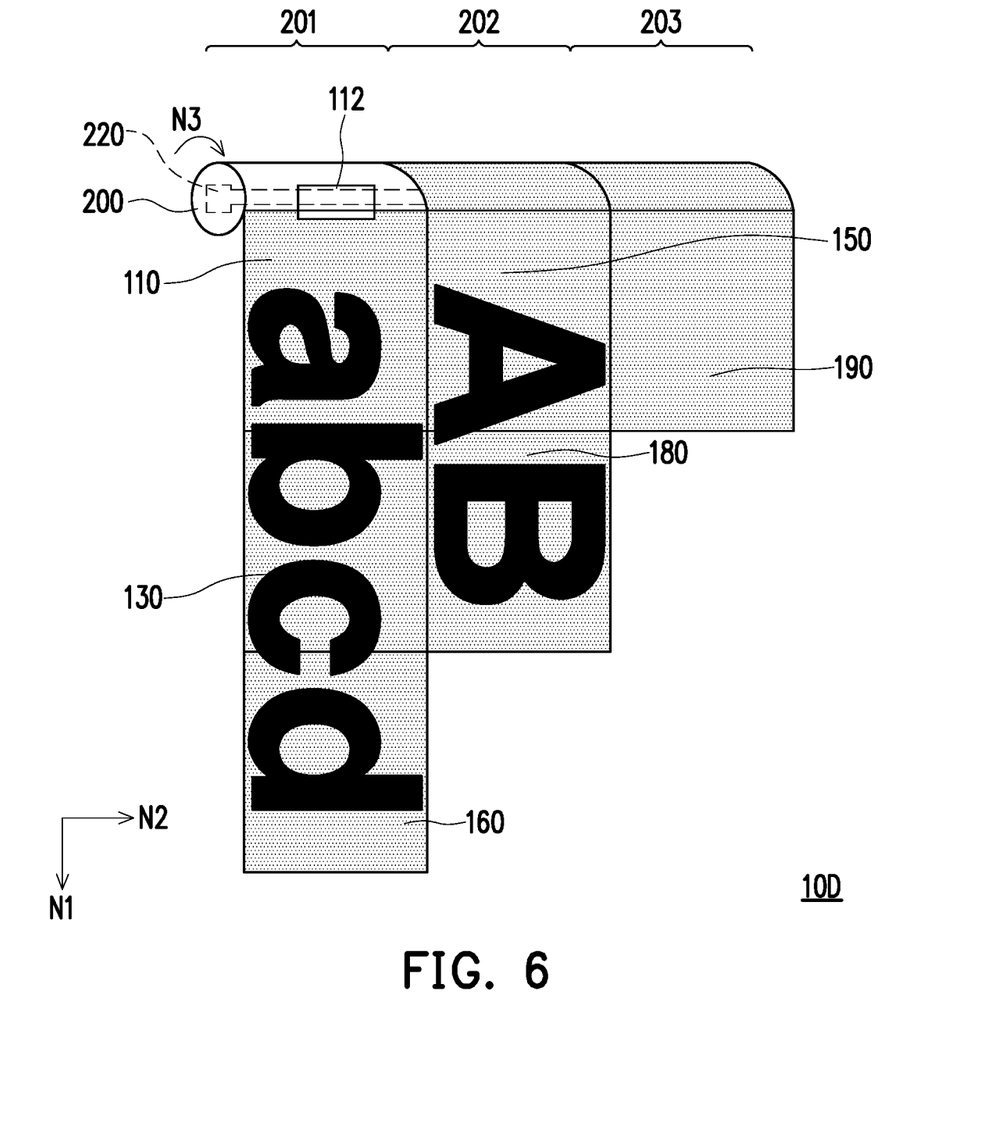
FIG. 6 is a top view of a display method of yet another electronic device of an embodiment of the disclosure.

FIG. 6 is a top view of a display method of yet another electronic device according to an embodiment of the disclosure. An electronic device 10D of the present embodiment is substantially similar to the electronic device 10 of FIG. 1, and therefore the same and similar members in the two embodiments are not repeated herein. The present embodiment is different from the electronic device 10 mainly in that the first segment 201, the second segment 202, and the third segment 203 of the roller 200 are independently rotated to sequentially drive the first display panel 110 and one of the other panels. For example, the first segment 201 may be rotated clockwise in the rotational direction N3 first to roll out the first display panel 110, the third display panel 130, and the sixth display panel 160 in the first direction N1. Next, the second segment 202 is rotated clockwise in the rotational direction N3 to roll out the fifth display panel 150 and the eighth display panel 180 in the first direction N1. Then, the third segment 203 is rotated clockwise in the rotational direction N3 to roll out the ninth display panel 190 in the first direction N1. In this way, the electronic device 10D may use a portion of the display panels and tile the display images of the display panels, thus forming an image of irregular shape.

However, the disclosure is not limited thereto. In some embodiments, the first segment 201, the second segment 202, and the third segment 203 may also be rotated simultaneously, but the first segment 201, the second segment 202, and the third segment 203 can be designed to stop rotating at different times. In this way, the desired display panels can be rolled out in the first direction N1, thus forming an image of irregular shape.

In the present embodiment, since the image displayed by each display panel is the smallest display unit after the entire image is divided, the entire image of irregular shape lacks images displayed by the display panels at corresponding positions, thus providing different visual effects. In some embodiments, the entire image may also be adjusted in accordance with the display panels which have been rolled out. Thus, a special visual effect can be provided, and the electronic device 10D can have better quality.

Figure 7:
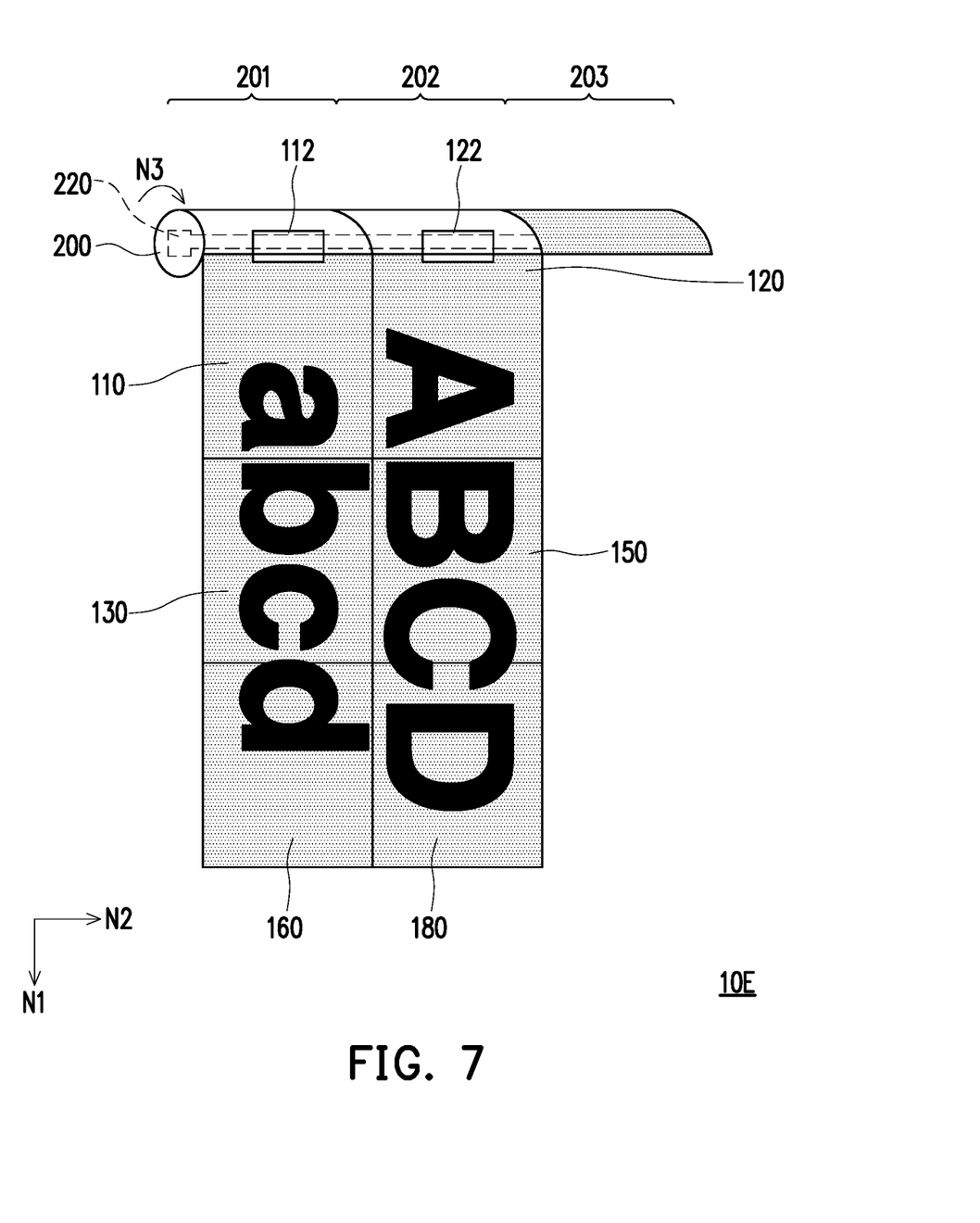
FIG. 7 is a top view of a display method of still yet another electronic device of an embodiment of the disclosure.

FIG. 7 is a top view of a display method of still yet another electronic device according to an embodiment of the disclosure. An electronic device 10E of the present embodiment is substantially similar to the electronic device 10 of FIG. 1, and therefore the same and similar members in the two embodiments are not repeated herein. The present embodiment differs from the electronic device 10 mainly in that the first segment 201 and the second segment 202 of the roller 200 are independently rotated to simultaneously or sequentially drive the first display panel 110 and other display panels (for example, the second display panel 120), but the third segment 203 may not be rotated. For example, the first segment 201 may be rotated clockwise in the rotational direction N3 to roll out the first display panel 110, the third display panel 130, and the sixth display panel 160 in the first direction N1, and the second segment 202 is rotated clockwise in the rotational direction N3 to roll out the second display panel 120, the fifth display panel 150, and the eighth display panel 180 in the first direction N1. However, the third segment 203 is not rotated such that the display panels are wound around the roller 200. In this way, the electronic device 10E may use a portion of the display panels (for example, six display panels of two columns and two rows), and the images of the display panels can be composed and tiled to form a complete display image of a tiled display device of the electronic device 10E. Thus, the tiled display device can be a portrait type, or can have a special aspect ratio. More specifically, the electronic device 10E is substantially a rollable tiled display device adopting portrait or special aspect ratio display method. Further, the electronic device 10E may also achieve excellent technical effects similar to those of the above embodiment.

Based on the above, according to some embodiments, in the electronic device and the driving method thereof, the first display panel transmit a plurality of signals to the at least two other display panels directly. Since the plurality of signals may be directly transmitted from the driving circuit of the first display panel to the driving circuits of the at least two other display panels, the cross-talk of the signals on the display panels may be reduced, the impedance of circuit transmission may be reduced, or signal delay may be reduced to avoid signal distortion so as to provide an electronic device having better quality. In addition, according to some embodiments, since the electronic device of an embodiment of the disclosure may reduce signal delay, the plurality of display panels may receive signals substantially simultaneously to perform turning on or refreshing, so that the electronic device 10 has better quality. In addition, since the driving circuit of the first display panel directly transmits signals to the driving circuits of at least two other display panels, the design of the traces on the display panels and/or the design of the active component layer may be simplified such that the electronic device may have better quality.

Finally, it should be noted that each of the above embodiments is only used to illustrate the technical solutions of the disclosure, and is not limited thereto. The features of each embodiment may be mixed and used as long as they do not violate the spirit of the disclosure or conflict each other. Although the disclosure has been described in detail with reference to each of the foregoing embodiments, those skilled in the art should understand that the technical solutions recited in each of the foregoing embodiments may still be modified or some or all of the technical features may be equivalently substituted. The modifications and substitutions do not make the essence of the corresponding technical solutions depart from the scope of the technical solutions of each embodiment of the disclosure.

What is claimed is:

1. A tiled electronic device, comprising:
   a first display panel;
   a second display panel, wherein the first display panel and the second display panel are disposed along a direction and;
   a roller, comprising a signal transmission component, wherein the signal transmission component comprises a transmission structure extending along the direction, the first display panel is electrically connected to the transmission structure, and the second display panel is electrically connected to the transmission structure.

2. The tiled electronic device of claim 1, wherein the second display panel is adjacent to the first display panel.

3. The tiled electronic device of claim 1, wherein the first display panel transmits signals simultaneously.

4. The tiled electronic device of claim 1, wherein the first display panel transmits signals sequentially.

5. The tiled electronic device of claim 1, wherein the tiled electronic device is a flexible display.

6. The tiled electronic device of claim 1, wherein the first display panel and the second display panel are composed to display an image.

7. The tiled electronic device of claim 1, wherein the first display panel comprises a first driving circuit, the second display panel comprises a second driving circuit, the first driving circuit is electrically connected to the transmission structure, and the second driving circuit is electrically connected to the transmission structure.

8. The tiled electronic device of claim 1, wherein the transmission structure comprises a first branch and a second branch, the first branch is electrically connected to the first display panel, and the second branch is electrically connected to the second display panel.

9. The tiled electronic device of claim 1, further comprising
   a third display panel, wherein the first display panel and the third display panel are disposed along another direction; and
   a connection structure, electrically connected to the first display panel and the third display panel.

10. The tiled electronic device of claim 9, wherein the third display panel is adjacent to the first display panel.

11. The tiled electronic device of claim 9, wherein the second display panel and the third display panel are located at different sides of the first display panel.

* * * * *